(12) United States Patent
Brook et al.

(10) Patent No.: US 7,895,649 B1
(45) Date of Patent: *Feb. 22, 2011

(54) DYNAMIC RULE GENERATION FOR AN ENTERPRISE INTRUSION DETECTION SYSTEM

(75) Inventors: Jon-Michael C. Brook, Clearwater, FL (US); Matthew C. Rixon, Sarasota, FL (US); Randall S. Brooks, Tampa, FL (US); Troy Dean Rockwood, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 1717 days.

This patent is subject to a terminal disclaimer.

(21) Appl. No.: 10/407,700

(22) Filed: Apr. 4, 2003

(51) Int. Cl.
*G06F 12/14* (2006.01)
*G06F 12/16* (2006.01)

(52) U.S. Cl. .............................. 726/22; 726/23; 726/2; 726/3; 726/26; 713/189; 713/188; 709/224; 709/225; 709/227; 709/236; 709/246

(58) Field of Classification Search ....................... None
See application file for complete search history.

(56) References Cited

U.S. PATENT DOCUMENTS

| | | | |
|---|---|---|---|
| 5,020,411 A | 6/1991 | Rowan ........................ 89/1.11 |
| 5,341,229 A | 8/1994 | Rowan ......................... 359/10 |
| 5,432,871 A | 7/1995 | Novik ......................... 382/232 |
| 5,790,599 A | 8/1998 | Wright, Jr. et al. |
| 5,805,801 A | 9/1998 | Holloway et al. ....... 395/187.01 |
| 5,991,881 A * | 11/1999 | Conklin et al. ................. 726/22 |
| 6,088,804 A | 7/2000 | Hill et al. |
| 6,226,589 B1 | 5/2001 | Maeda et al. ............... 701/207 |
| 6,253,337 B1 | 6/2001 | Maloney et al. ............... 714/38 |
| 6,327,550 B1 | 12/2001 | Vinberg et al. .............. 702/186 |
| 6,341,298 B1 | 1/2002 | Ilani |
| 6,347,263 B1 | 2/2002 | Johnson et al. ............... 701/14 |
| 6,404,380 B2 | 6/2002 | Poore, Jr. ...................... 342/96 |
| 6,408,297 B1 | 6/2002 | Ohashi ........................ 707/10 |
| 6,421,467 B1 | 7/2002 | Mitra |
| 6,574,378 B1 | 6/2003 | Lim |
| 6,633,882 B1 | 10/2003 | Fayyad et al. |
| 6,650,779 B2 | 11/2003 | Vachtesvanos et al. |
| 6,665,715 B1 | 12/2003 | Houri ......................... 709/223 |
| 6,674,911 B1 | 1/2004 | Pearlman et al. |
| 6,744,396 B2 | 6/2004 | Stone et al. .................... 342/36 |
| 6,954,775 B1 * | 10/2005 | Shanklin et al. ............. 718/105 |

(Continued)

OTHER PUBLICATIONS

A. Arnold, "Kernel Based Anomaly Detection," Intrusion Detection Systems, Machine Learning Group, Columbia University, 2 pages, Apr. 26, 2001.

(Continued)

*Primary Examiner*—Syed A. Zia
(74) *Attorney, Agent, or Firm*—Baker Botts L.L.P.

(57) ABSTRACT

A method for dynamically generating rules for an enterprise intrusion detection system comprises receiving a packet flow from a sensor. The packet flow is dynamically processed to detect if the packet flow represents an attack on the enterprise system. A response message is automatically generated in response to the attack, the response message comprising a signature to identify the attack. The response message is automatically communicated to a response message file, the response message file comprising at least one response message.

30 Claims, 7 Drawing Sheets

U.S. PATENT DOCUMENTS

| | | | |
|---|---|---|---|
| 7,017,186 B2 | 3/2006 | Day | |
| 7,058,976 B1 | 6/2006 | Dark | 726/23 |
| 7,100,204 B1 | 8/2006 | Myllymaki et al. | |
| 7,127,743 B1 | 10/2006 | Khanolkar et al. | 726/23 |
| 7,130,611 B2 | 10/2006 | Kimura et al. | 455/404.2 |
| 7,146,421 B2 | 12/2006 | Syvanne | 709/226 |
| 7,185,368 B2 | 2/2007 | Copeland, III | 726/25 |
| 7,251,376 B2 | 7/2007 | Qian et al. | |
| 7,324,108 B2 | 1/2008 | Hild et al. | 345/440 |
| 7,369,565 B2 * | 5/2008 | Lee et al. | 370/412 |
| 7,370,358 B2 | 5/2008 | Ghanea-Hercock | 726/23 |
| 7,454,499 B2 * | 11/2008 | Cantrell et al. | 709/225 |
| 7,593,911 B1 * | 9/2009 | Farah | 706/47 |
| 7,681,032 B2 * | 3/2010 | Peled et al. | 713/154 |
| 7,752,017 B1 * | 7/2010 | Leary et al. | 703/2 |
| 2001/0011211 A1 * | 8/2001 | Bushey et al. | 703/22 |
| 2002/0059164 A1 | 5/2002 | Shtivelman | 707/1 |
| 2002/0078381 A1 | 6/2002 | Farley et al. | 713/201 |
| 2002/0112189 A1 | 8/2002 | Syvanne et al. | 713/201 |
| 2002/0165842 A1 | 11/2002 | Hellerstein et al. | 706/47 |
| 2003/0009699 A1 | 1/2003 | Gupta et al. | 713/201 |
| 2003/0023876 A1 | 1/2003 | Bardsley et al. | 713/201 |
| 2003/0058339 A1 | 3/2003 | Trajkovic et al. | 348/155 |
| 2003/0105976 A1 | 6/2003 | Copeland, III | 713/201 |
| 2003/0145226 A1 | 7/2003 | Bruton et al. | |
| 2003/0154399 A1 * | 8/2003 | Zuk et al. | 713/201 |
| 2003/0177383 A1 | 9/2003 | Ofek et al. | |
| 2003/0188189 A1 | 10/2003 | Desai et al. | 713/201 |
| 2003/0200236 A1 | 10/2003 | Hong | |
| 2003/0217289 A1 | 11/2003 | Ammon et al. | 713/201 |
| 2004/0015719 A1 * | 1/2004 | Lee et al. | 713/201 |
| 2004/0024855 A1 * | 2/2004 | Tsai et al. | 709/223 |
| 2004/0025044 A1 | 2/2004 | Day | |
| 2004/0044912 A1 | 3/2004 | Connary et al. | 713/201 |
| 2004/0049698 A1 | 3/2004 | Ott et al. | 713/201 |
| 2004/0098623 A1 | 5/2004 | Scheidell | 713/201 |
| 2004/0103211 A1 * | 5/2004 | Jackson et al. | 709/244 |
| 2004/0107125 A1 | 6/2004 | Guheen et al. | 705/7 |
| 2004/0117407 A1 | 6/2004 | Kumar et al. | 707/200 |
| 2004/0117654 A1 | 6/2004 | Feldman et al. | |
| 2004/0133543 A1 | 7/2004 | Shlaes et al. | 707/1 |
| 2004/0172557 A1 | 9/2004 | Nakae et al. | |
| 2004/0193943 A1 * | 9/2004 | Angelino et al. | 714/4 |
| 2004/0215977 A1 | 10/2004 | Goodman et al. | |
| 2004/0260945 A1 | 12/2004 | Raikar et al. | 713/201 |
| 2004/0261116 A1 | 12/2004 | Mckeown et al. | 725/109 |
| 2004/0267886 A1 | 12/2004 | Malik | |
| 2005/0035965 A1 | 2/2005 | Sloan et al. | |
| 2005/0044406 A1 | 2/2005 | Stute | 713/201 |
| 2005/0047670 A1 | 3/2005 | Qian et al. | |
| 2005/0108518 A1 | 5/2005 | Pandya | 713/151 |
| 2005/0138110 A1 | 6/2005 | Redlich et al. | 709/201 |
| 2005/0222996 A1 | 10/2005 | Yalamanchi | 707/4 |
| 2005/0254654 A1 | 11/2005 | Rockwell et al. | 380/270 |
| 2006/0010493 A1 | 1/2006 | Piesco et al. | 726/23 |
| 2006/0031934 A1 | 2/2006 | Kriegel | 726/22 |
| 2006/0130070 A1 | 6/2006 | Graf | 719/318 |
| 2006/0209836 A1 | 9/2006 | Ke et al. | 370/392 |
| 2006/0253905 A1 | 11/2006 | Mansel | 726/23 |
| 2006/0253907 A1 | 11/2006 | McConnell | 726/23 |
| 2007/0009160 A1 | 1/2007 | Loo et al. | |

OTHER PUBLICATIONS

R. Bace and P. Mell, "NIST Special Publication on Intrusion Detection Systems," 51 pages, Feb. 2001.

C. Boeckman, "Getting Closer to Policy-Based Intrusion Detection." Information Security Bulletin, pp. 13-20, May 2000.

Cisco Systems, Inc., "NetRanger User Guide 2.2.1," Chapters 1-9 and Appendices A-C, 2000.

Commonwealth of Australia, "Handbook 13, Intrusion Detection and Audit Analysis v. 1.0," Australian Communications-Electronic Security Instruction 33 (ACSI 33).

D. Curry, and H. Debar, "Intrusion Detection Message Exchange Format Data Model and Extensible Markup Language (XML) Document Type Definition," Intrusion Detection Working Group, 116 pages, Jan. 2003.

W. Jansen, P. Mell, et al., "Mobile Agents in Intrusion Detection and Response." National Institute for Standards and Technology, 12 pages, Jun. 2000.

Symantec, "Intrusion Detection," 4 pages, 2002.

Intrusion.com, Inc., "Network Intrusion Detection System Product Overview," SecureNet Series, 6 pages, Jul. 2001.

Phung, "Data Mining in Intrusion Detection," Sans.org, 3 pages, Jan. 24, 2000.

R. Power, "CSI Roundtable: Experts discuss present and future intrusion detection systems," Computer Security Journal vol. XIV, #1, 2001.

R. Raghudharan, "Intrusion detection Systems: Beyond the first line of defense," Network Magazine, 7 pages, Sep. 2001.

ISS Corporation, "ISS RealSecure © Protection System," 5 pages Apr. 1, 2003.

Stick, "A Potential Denial of Service Against IDS Systems," Internet Security Systems Security Alert, 2 pages, Mar. 2001.

S. Northcutt, and J. Novak, "Network Intrusion Detection: An Analyst's Handbook," $2^{nd}$ Ed., 18 pages, Sep. 2000.

B. Yocom, K. Brown, and D. Van Derveer, "Intrusion Detection Products Grow Up," Network World, 12 pages, Oct. 2001.

Y.F. Jou, F. Gong, C. Sargor, X Wu, S.F. Wu, H.Y. Chang and F. Wang, "Design and implementation of a scalable intrusion detection system for protection of network infrastructure," DARPA Information Survivability Conference and Exposition (DISCEX), 15 pages, Jan. 2000.

J. Li and G. Eschelbeck, "Multi-Tier Intrusion Detection System," 11 pages.

F. Wang, F. Gong, C. Sargor, K. Goseva-Popstojanova, K. Trivedi and F. Jou, "SITAR: A Scalable intrusion-Tolerant Architecture for Distributed Services," IEEE Workshop on Information Assurance and Security, pp. 38-45, Jun. 2001.

S.F. Wu, H.C. Chang, F. Jou, F. Wang, F. Gong, C. Sargor, D. Qu and R. Cleaveland, "JiNao: Design and Implementation of a Scalable Intrusion Detection System for the OSPF Routing Protocol," pp. 0-23, Feb. 24, 1999.

Patent Pending U.S. Appl. No. 11/559,786, entitle "*Compressing N-Dimensional Data*", inventors Qin Jiang, et al., 31 pages plus 3 pages of drawings, filed Nov. 14, 2006.

Allen Gersho, et al., entitled "*Vector Quantization and Signal Compression*," Academic Publisher, 737 pages, 1992.

Sanjoy Dasgupta; Experiments with Random Projection; Proc. 16th Conference Uncertainty in Artificial intelligence (UAI), 9 pages, 2000.

Troy Dean, *USPTO, Office Action* for U.S. Appl. No. 11/176,436, filed Jul. 6, 2005, mailed Aug. 7, 2009.

Qin Jian, *USPTO, Office Action* for U.S. Appl. No. 11/559,786, filed Nov. 14, 2006, mailed Aug. 10, 2009.

Troy Dean, *USPTO, Office Action* for U.S. Appl. No. 11/328,689, filed Jan. 10, 2006, mailed Sep. 10, 2009.

USPTO, Office Action for U.S. Appl. No. 11/219,291, filed Sep. 1, 2005 in the name of Troy Rockwood, 32 pages, Mailed Dec. 11, 2009.

USPTO; Office Action for U.S. Appl. No. 11/176,436, filed Jul. 6, 2005 in the name of Troy Dean Rockwood; 20 pages; Dec. 24, 2009.

USPTO; Office Action for U.S. Appl. No. 11/219,025, filed Sep. 1, 2005, Inventor Troy Dean Rockwood; 12 pages; Jan. 5, 2010.

USPTO; Office Action for U.S. Appl. No. 11/559,786, filed Nov. 14, 2006 in the name of Qin Jiang; 22 pages; Jan. 22, 2010.

USPTO; Office Action for U.S. Appl. No. 11/559,786, filed Nov. 14, 2006 in the name of Qin Jiang; 24 pages; Jul. 15, 2010.

USPTO; Office Action for U.S. Appl. No. 11/328,689, filed Jan. 10, 2006, Inventor Troy Dean Rockwood; 25 pages; Feb. 22, 2010.

USPTO; Final Office Action, U.S. Appl. No. 11/219,025, filed Sep. 1, 2005, Inventor Troy Dean Rockwood; May 28, 2010, 13 pages.

USPTO; Office Action for U.S. Appl. No. 11/176,436, filed Jul. 6, 2005 in the name of Troy Dean Rockwood; 20 pages; Jun. 3, 2010.

USPTO; Office Action, U.S. Appl. No. 11/219,291, filed Sep. 1, 2005 in the name of Troy Dean Rockwood; 36 pages, Jun. 24, 2010.
USPTO; Advisory Action, U.S. Appl. No. 11/328,689, filed Jan. 10, 2006 in the name of Troy Dean Rockwood; 2 pages, Nov. 30, 2009.
Rockwood, "Response Pursuant to 37 C.F.R. §1.111," U.S. Appl. No. 11/219,025, 11 pages, filed with USPTO Jun. 24, 2008.
Rockwood, "Response Pursuant to 37 C.F.R. §1.111," U.S. Appl. No. 11/219,025, 16 pages, filed with USPTO Apr. 14, 2009.
Rockwood, "Response Pursuant to 37 C.F.R. §1.111," U.S. Appl. No. 11/176,436, 12 pages, filed with USPTO May 11, 2009.
Rockwood, "Response Pursuant to 37 C.F.R. §1.111," U.S. Appl. No. 11/328,689, 15 pages, filed with USPTO Jun. 19, 2009.
Rockwood, "Response Pursuant to 37 C.F.R. §1.111," U.S. Appl. No. 11/219,291, 14 pages, filed with USPTO Aug. 20, 2009.
Rockwood, "Response Pursuant to 37 C.F.R. §1.111," U.S. Appl. No. 11/219,025, 11 pages, filed with USPTO Oct. 22, 2009.
Rockwood, "Response Pursuant to 37 C.F.R. §1.116," U.S. Appl. No. 11/176,436, 11 pages, filed with USPTO Oct. 7, 2009.
Rockwood, "Response Pursuant to 37 C.F.R. §1.116," U.S. Appl. No. 11/328,689, 15 pages, filed with USPTO Nov. 9, 2009.
Rockwood, "Response Pursuant to 37 C.F.R. §1.116," U.S. Appl. No. 11/219,025, 12 pages, filed with USPTO Nov. 10, 2008.
Rockwood, "Response Pursuant to 37 C.F.R. §1.111," U.S. Appl. No. 11/219,291, 13 pages, filed with USPTO Mar. 11, 2010.
Rockwood, "Response Pursuant to 37 C.F.R. §1.111," U.S. Appl. No. 11/176,436, 13 pages, filed with USPTO Mar. 24, 2010.
Rockwood, "Response Pursuant to 37 C.F.R. §1.111," U.S. Appl. No. 11/219,025, 13 pages, filed with USPTO Apr. 5, 2010.
Rockwood, "Response Pursuant to 37 C.F.R. §1.111," U.S. Appl. No. 11/559,786, 13 pages, filed with USPTO Apr. 22, 2010.
Rockwood, "Response Pursuant to 37 C.F.R. §1.111," U.S. Appl. No. 11/559,786, 12 pages, filed with USPTO Nov. 10, 2009.
Liu et al., "incremental Maintenance of Nested Relational Views," Database Engineering and Applications, 1999, 9 pages, Aug. 2-4, 1999.
Noel et al., "Correlating Intrusion Events and Building Attack Scenarios Through Attack Graph Distances", 2004, Computer Security Applications Conferences, 2004, 20th Annual, 10 pages, 2004.
N. Hari Narayanan, et al.; *A Methodology for Knowledge Acquisition and Reasoning in Failure Analysis of Systems*; IEEE Transactions on Systems, Man and Cybernetics; vol. SMC-17, No. 2; pp. 274-288, 1987.
Henry S. Vaccaro; *Detection of Anomalous Computer Session Activity*; IEEE Symposium on Research in Security and Privacy; 24 pages, May 1989.
Henry S. Teng, et al.; *Security Audit Trail Analysis Using Iductively Generated Predictive Rules*; IEEE; CH2842-3/90/0000/0024; pp. 24-29, 1990.
Henry S. Teng, et al.; *Adaptive Real-Time Anomaly Detection Using Inductively Generated Sequential Patterns*; IEEE; CH2884-5/90/0000/0278; pp. 278-284, 1990.
Keith C. C. Chan, et al.; *Learning Sequential Patterns for Probabilistic Inductive Prediction*; IEEE Transactions on Systems, Man, and Cybernetics; vol. 24, No. 10; 16 pages, Oct. 1994.
F. Girault, et al.; *Linear Logic as a Tool for Reasoning on a Petri Net Model*; IEEE Symposium on Emerging Technologies and Factory Automation; 11 pages, Oct. 1995.
P. Nassery, et al.; *Real Time Seismic Signal Processing Using the ARMA Model Coefficients and an Intelligent Monitoring System*; IEEE TENCON—Speech and Image Technologies for Computing and Telecommunications; pp. 807-810, 1997.
Moataz A. Ahmed, et al.; *Rule-Based Information Distribution Systems: Near-Optimal Rule Sets Generation*; IEEE; 0-7803-4778-1; pp. 1564-1569, 1998.
P. Lang, et al.; *A Graphical Editor for the Conceptual Design of Business Rules*; 1 page, Feb. 1998.
Alistair G. Sutcliffe, et al.; *Supporting Scenario-Based Requirements Engineering*; IEEE Transactions on Software Engineering; vol. 24, No. 12; pp. 1072-1088, Dec. 1998.
Adrian K. Rantilla, et al.; *Aggregation of Expert Opinions*; Proceedings of the 32nd Hawaii International Conference on System Sciences; IEEE; 0-7695-0001-3/99; pp. 1-11, 1999.
Slavica Jonic, et al.; *Three Machine Learning Techniques for Automatic Determination of Rules to Control Locomotion*; IEEE Transactions on Biomedical Engineering; vol. 46, No. 3; pp. 300-310, Mar. 1999.
Ian Ho, et al.; *Generating Test Cases for Real-Time Software by Time Petri Nets Model*; Proceedings Eighth Asian Test Symposium; 7 pages, Nov. 1999.
Virtyt Koshi; *Radio Network Planning for Ultra TDD Systems*; First International Conference on 3G Mobile Communication Technologies; 7 pages, Mar. 2000.
Ilham Benyahia, et al.; *An Adaptive Framework for Distributed Complex Applications Development*; Proceedings 34th International Conference on Technology of Object-Oriented Languages and Systems; 12 pages, Jul. 2000.
Tae-Sic Yoo, et al.; *New Results on Decentralized Supervisory Control of Discrete-Event Systems*; 6 pages, Dec. 2000.
Sheng, Ma, et al.; *Event Miner: An Integrated Mining Tool for Scalable Analysis of Event Data*; 17 pages, May 21, 2001.
Ping-Peng Yuan, et al.; *An Event and Service Interacting Model and Event Detection Based on the Broker/Service Model*; pp. 20-24, Jul. 2001.
W. E. Brown, et al.; *Estimation of Ocean Bottom Scattering Strength Using Discrete Eigenray Matching in Shallow Water*; MTS 0-933-957-28-9; pp. 1636-1639, Nov. 2001.
XiaoShu Hang, et al.; *A FSA-Based Approach for Mining Sequential Patterns With User-Specified Skeletons*; Proceedings of the 4th World Congress on Intelligent Control and Automation; 6 pages, Jun. 2002.
Azizi Ab Aziz, et al.; *Development of an Adaptive Business Insolvency Classifier Prototype (AVICENA) Using Hybrid Intelligent Algorithms*; Proceedings Globalizing Research and Development in Electrical and Electronics Engineering; 5 pages, Jul. 2002.
Loganathan Lingappan, et al.; *Test Generation for Non-Separable RTL Controller-Datapath Circuits Using a Satisfiability Based Approach*; Proceedings of the 21st International Conference on Computer Design; 7 pages, 2003.
Patent Pending U.S. Appl. No. 10/407,513 entitled *Vertically Extensible Intrusion Detection Systems and Method* in the name of Jon-Michael C. Brook; 51 total pages, filed Apr. 4, 2003.
Patent Pending U.S. Appl. 10/407,030 entitled *Graphical User Interface for an Enterprise Intrusion Detection System* in the name of Jon-Michael C. Brook; 41 total pages, filed Apr. 4, 2003.
F. Y. Nakamoto, et al.; *Systematization of the Project of the Production System Control*; IEEE International Symposium on Industrial Electronics; 8 pages, Jun. 2003.
Nicholas Pioch, et al.; *CADRE: Continuous Analysis and Discovery From Relational Evidence*; International Conference on Integration of Knowledge Intensive Multi-Agent Systems; 9 pages, Sep. 2003.
Andrew Hamilton-Wright, et al.; *Constructing a Fuzzy Rule Based Classification System Using Pattern Discovery*; NAFIPS 2005—2005 Annual Meeting of the North American Fuzzy Information Processing Society; pp. 460-465, 2005.
Patent Pending U.S. Appl. No. 11/176,436 entitled *System and Method for Active Data Collection in a Network Security System* in the name of Troy D. Rockwood; 25 total pages, filed Jul. 6, 2005.
Patent Pending U.S. Appl. No. 11/219,291 entitled *System and Method for Collaborative Information Security Correlation in Low Bandwidth Environments* in the name of Troy D. Rockwood; 51 total pages, filed Sep. 1, 2005.
Patent Pending U.S. Appl. No. 11/219,025 entitled *System and Method for Interactive Correlation Rule Design in a Network Security System* in the name of Troy D. Rockwood; 35 total pages, filed Sep. 1, 2005.
Patent Pending U.S. Appl. No. 11/219,595 entitled *System and Method for Intruder Tracking Using Advanced Correlation in a Network Security System* in the name of Troy D. Rockwood; 50 total pages, filed Sep. 1, 2005.
USPTO; *Office Action* for U.S. Appl. No. 10/407,030, filed Apr. 4, 2003 in the name of Jon-Michael C. Brook; 9 pages, Jan. 8, 2007.
USPTO; *Office Action* for U.S. Appl. No. 10/407,513, filed Apr. 4, 2003 in the name of Jon-Michael C. Brook; 12 pages, Mar. 27, 2007.
USPTO; *Office Action* for U.S. Appl. No. 11/219,595, filed Sep. 1, 2005 in the name of Troy Dean Rockwood; 17 pages, Jun. 7, 2007.

*USPTO; Notice of Allowance and Fee(s) Due* for U.S. Appl. No. 10/407,030, filed Apr. 4, 2003 in the name of Jon-Michael C. Brook; 15 pages, Aug. 24, 2007.
*USPTO; Notice of Allowance and Fee(s) Due* for U.S. Appl. No. 10/407,513, filed Apr. 4, 2003 in the name of Jon-Michael C. Brook; 17 pages, Nov. 6, 2007.
*USPTO; Notice of Allowance and Fee(s) Due* for U.S. Appl. No. 11/219,595, filed Sep. 1, 2005 in the name of Troy Dean Rockwood; 6 pages, Nov. 7, 2007.
*USPTO; Office Action* for U.S. Appl. No. 11/219,025, filed Sep. 1, 2005 in the name of Troy Dean Rockwood; 11 pages, Mar. 24, 2008.
*USPTO; Office Action* for U.S. Appl. No. 11/219,025, filed Sep. 1, 2005 in the name of Troy Dean Rockwood; 12 pages, Sep. 10, 2008.
*USPTO; Advisory Action* for U.S. Appl. No. 11/219,025, filed Sep. 1, 2005 in the name of Troy Dean Rockwood; 3 pages, Nov. 20, 2008.
*USPTO; Office Action* for U.S. Appl. No. 11/219,291, filed Sep. 1, 2005 in the name of Troy Dean Rockwood; 33 pages, Dec. 11, 2008.
*IEEE Xplore Release 2.5 Search Results*; 4 pages, Retrieved Jan. 6, 2009.
*USPTO; Office Action* for U.S. Appl. No. 11/219,025, filed Sep. 1, 2005 in the name of Troy Dean Rockwood; 16 pages, Jan. 15, 2009.
*USPTO; Office Action* for U.S. Appl. No. 11/176,436, filed Jul. 6, 2005 in the name of Troy Dean Rockwood; 29 pages, Feb. 10, 2009.
*USPTO; Office Action* for U.S. Appl. No. 11/219,291, filed Sep. 1, 2005 in the name of Troy Dean Rockwood; 36 pages, May 20, 2009.
Peng Ning, et al.; *Techniques and Tools for Analyzing Intrusion Alerts*; ACM Transactions on Information and System Security; vol. 7, No. 2; 45 pages, May 2004.
Patent Pending U.S. Appl. No. 11/328,689 entitled *System and Method for Attacker Attribution in a Network Security System* in the name of Troy Dean Rockwood; 51 total pages, filed Jan. 10, 2006.
*USPTO; Office Action* for U.S. Appl. No. 11/328,689, filed Jan. 10, 2006 in the name of Troy Dean Rockwood; 18 pages, Mar. 19, 2009.
*USPTO; Office Action* for U.S. Appl. No. 11/219,025, filed Sep. 1, 2005 in the name of Troy Dean Rockwood; 12 pages, Jul. 22, 2009.

* cited by examiner

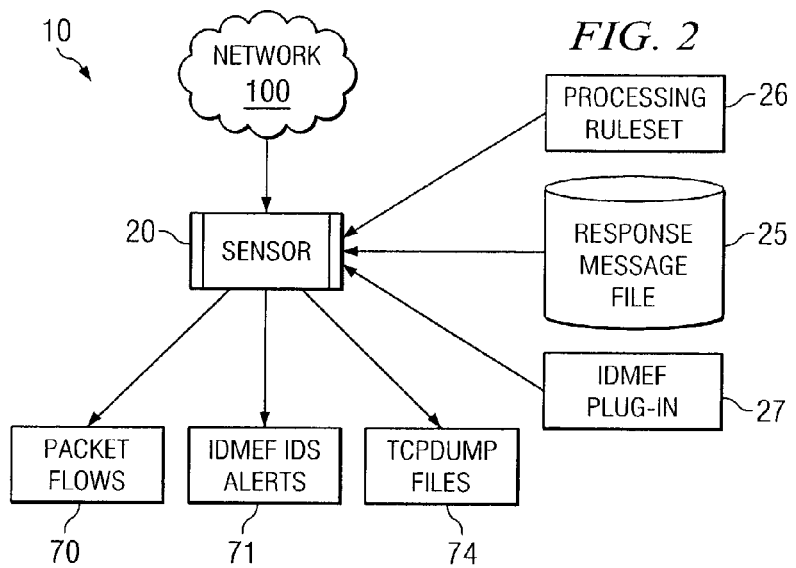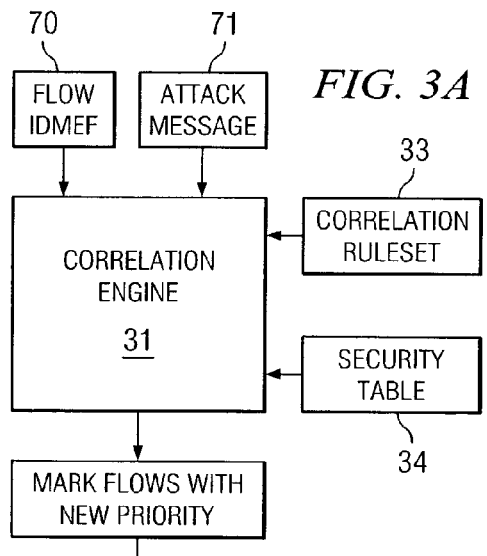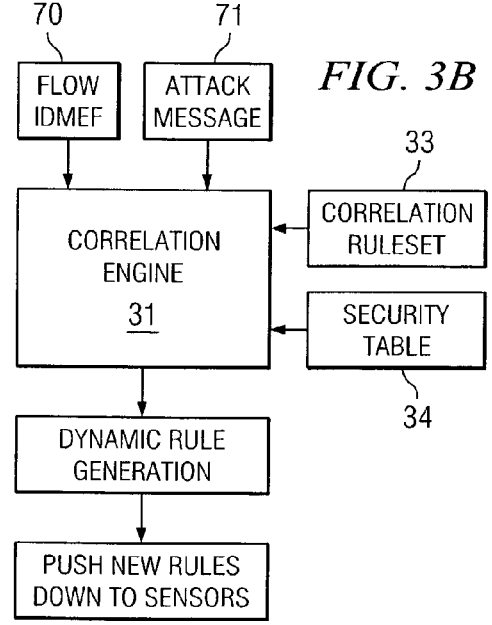

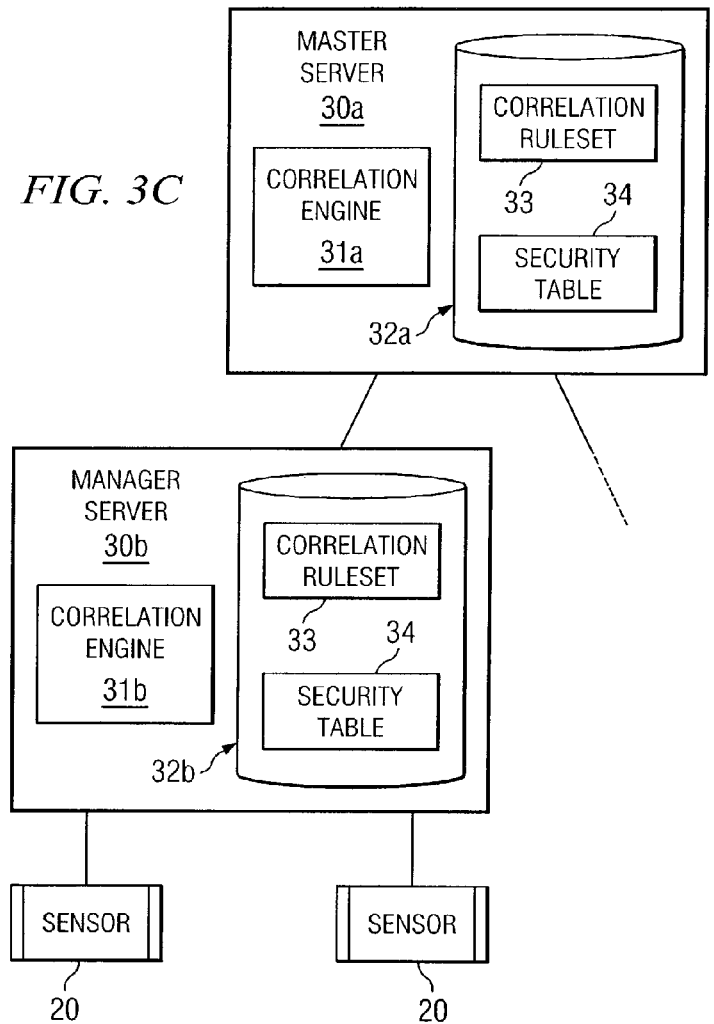
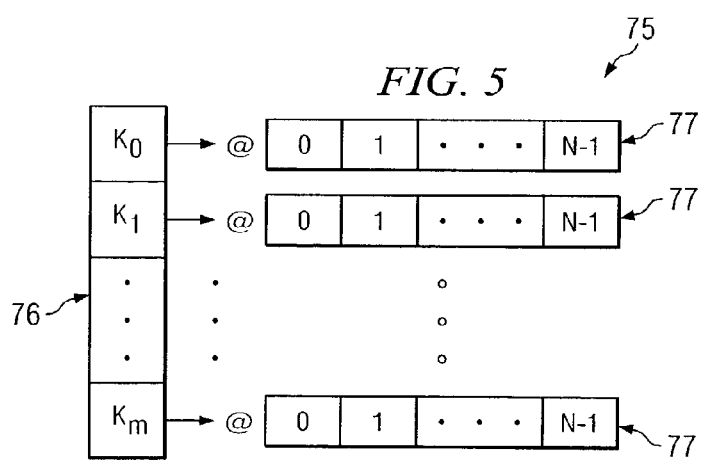

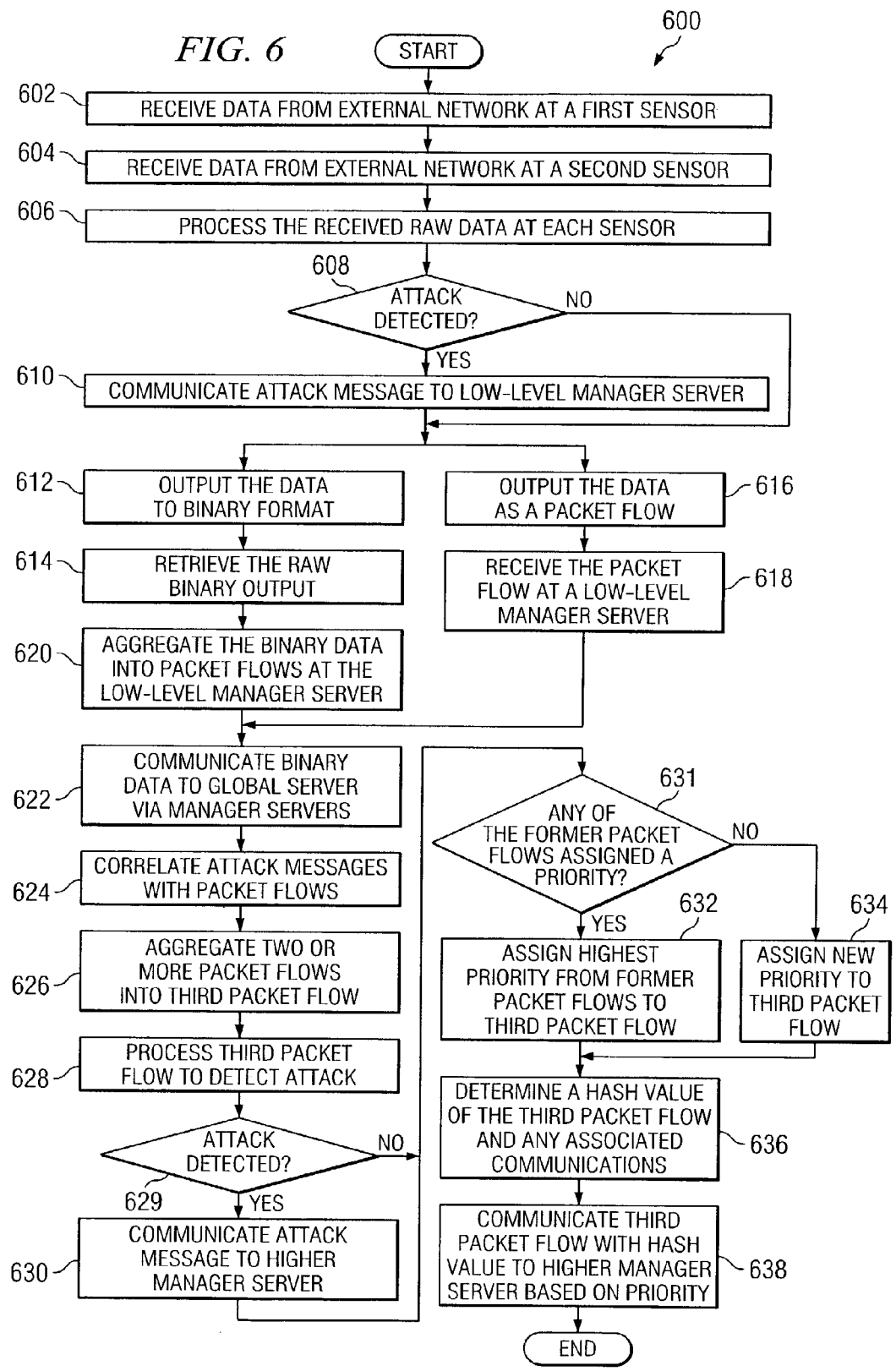

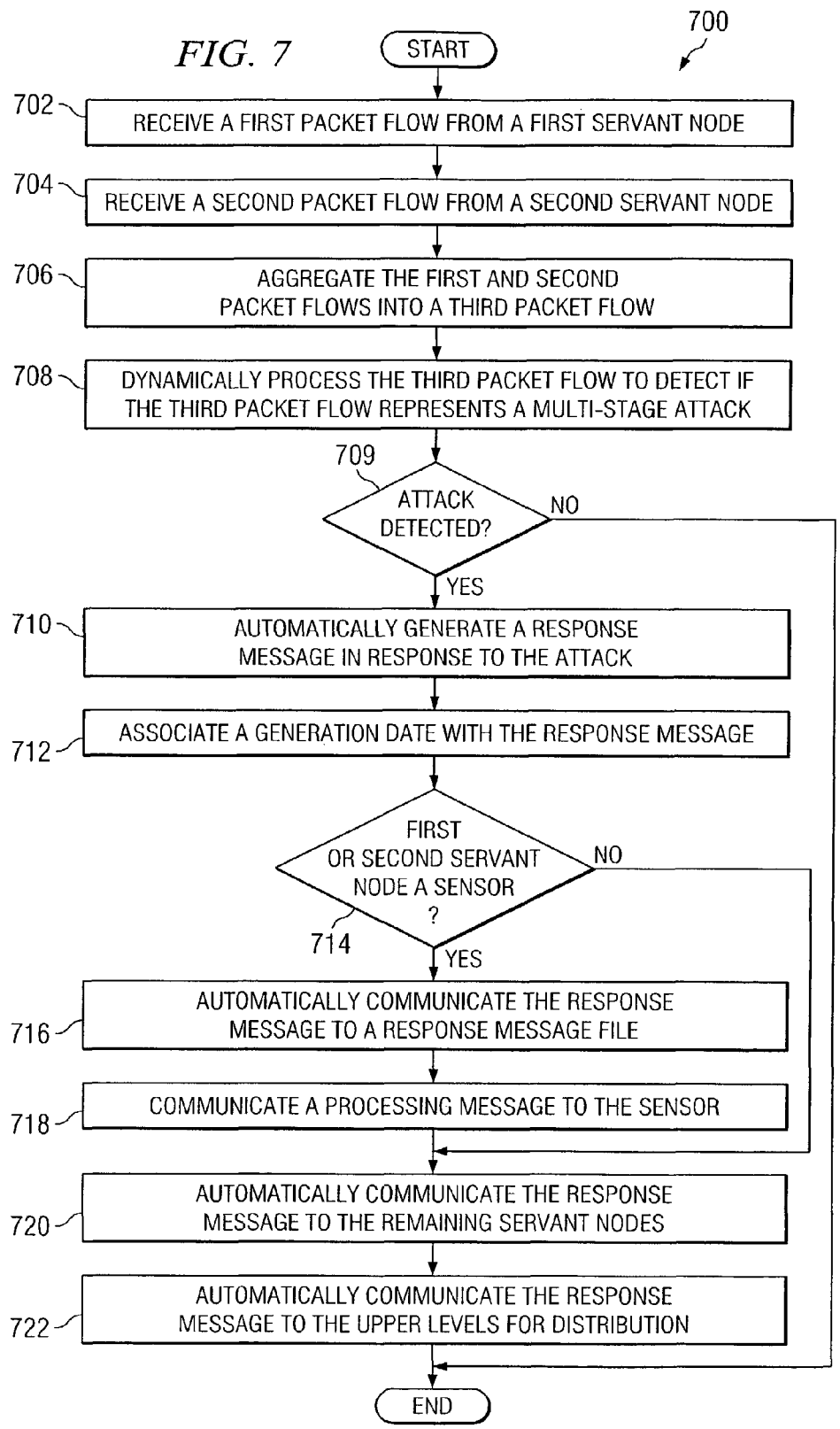

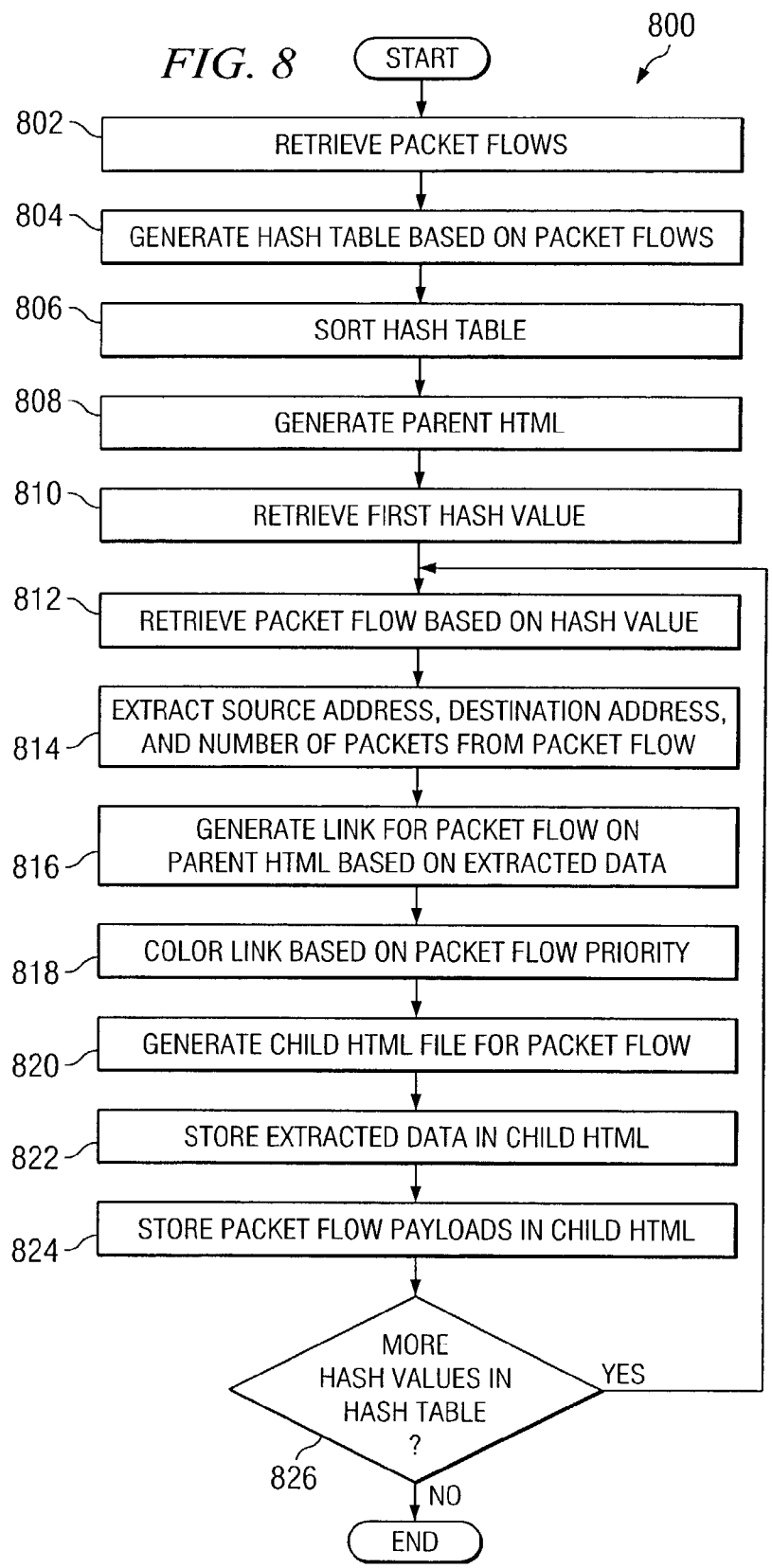

DYNAMIC RULE GENERATION FOR AN ENTERPRISE INTRUSION DETECTION SYSTEM

RELATED APPLICATIONS

This application is related to:

U.S. application Ser. No. 10/407,513 (now U.S. Pat. No. 7,356,585) for a "VERTICALLY EXTENSIBLE INTRUSION DETECTION SYSTEM AND METHOD," Apr. 4, 2003 by Jon-Michael C. Brook, Matthew C. Rixon, Randall S. Brooks, and Troy Dean Rockwood (064750.0465); and U.S. application Ser. No. 10/407,030 for a "GRAPHICAL USER INTERFACE FOR AN ENTERPRISE INTRUSION DETECTION SYSTEM," Apr. 4, 2003 by Jon-Michael C. Brook, Matthew C. Rixon, Randall S. Brooks, and Troy Dean Rockwood (064750.0472).

TECHNICAL FIELD OF THE INVENTION

This invention relates to intrusion detection systems and, more specifically, to dynamic rule generation for an enterprise intrusion detection system.

BACKGROUND OF THE INVENTION

Intrusion detection systems are used by an enterprise to detect and identify unauthorized or unwanted use (commonly called an attack) of the enterprise's computer network, which normally comprises a large number of nodes and network operations centers (NOCs). In general, these enterprise intrusion detection systems scan incoming data for specific patterns in network traffic, audit trails, and other data sources to detect malicious activity. Due to the large quantity of data, conventional intrusion detection systems often use many analysts to evaluate network data with various tool implementations for identifying the patterns, such as finite state machines, simple pattern matching, or specialized algorithms.

Traditional enterprise intrusion detection systems (IDSs) do not include an ability to quickly and dynamically update intrusion signatures at a large number of nodes. Often this is due to the lack of reliable scalability of the IDS and\or poor communication between various components of the IDS across an enterprise. Additionally, conventional IDSs normally do not include the capability to effectively detect or respond to long-term attacks.

SUMMARY OF THE INVENTION

In accordance with the present invention, the disadvantages and problems associated with traditional enterprise intrusion detection systems have been substantially reduced or eliminated.

One aspect of the invention is a method for dynamically generating rules for an enterprise intrusion detection system comprises receiving a packet flow from a sensor. The packet flow is dynamically processed to detect if the packet flow represents an attack on the enterprise system. A response message is automatically generated in response to the attack, the response message comprising a signature to identify the attack. The response message is automatically communicated to a response message file, the response message file comprising at least one response message.

The invention has several important technical advantages. Various embodiments of the invention may have none, some, or all of these advantages. One advantage of the present invention might be an ability to collect more information that allows slow or low-level attacks to be detected. Further potential advantages include enterprise-wide deployment of dynamic signatures in response to an attack, or reducing the volume of information passed between various system or network levels. Other technical advantages of the present invention will be readily apparent to one skilled in the art.

BRIEF DESCRIPTION OF THE DRAWINGS

For a more complete understanding of the present invention and its advantages, reference is now made to the following descriptions, taken in conjunction with the accompanying drawings, in which:

FIG. 2 illustrates an embodiment of a sensor in accordance with the system of FIG. 1;

FIGS. 3A-C illustrate various embodiments of a correlation engine of the system of FIG. 1;

FIG. 5 illustrates an embodiment of a hash table used by the graphical user interface of FIG. 4;

FIG. 6 is a flowchart illustrating a method for aggregating a plurality of flows in accordance with the vertically extensible intrusion detection system of FIG. 1;

FIG. 7 is a flowchart illustrating a method for dynamic rule generation in accordance with the vertically extensible intrusion detection system of FIG. 1; and FIG. 8 is a flow chart illustrating a method for generating a user interface using sorted packet flows for use by graphical user interface of FIG. 4.

DETAILED DESCRIPTION OF EXAMPLE EMBODIMENTS OF THE INVENTION

Figure 1:
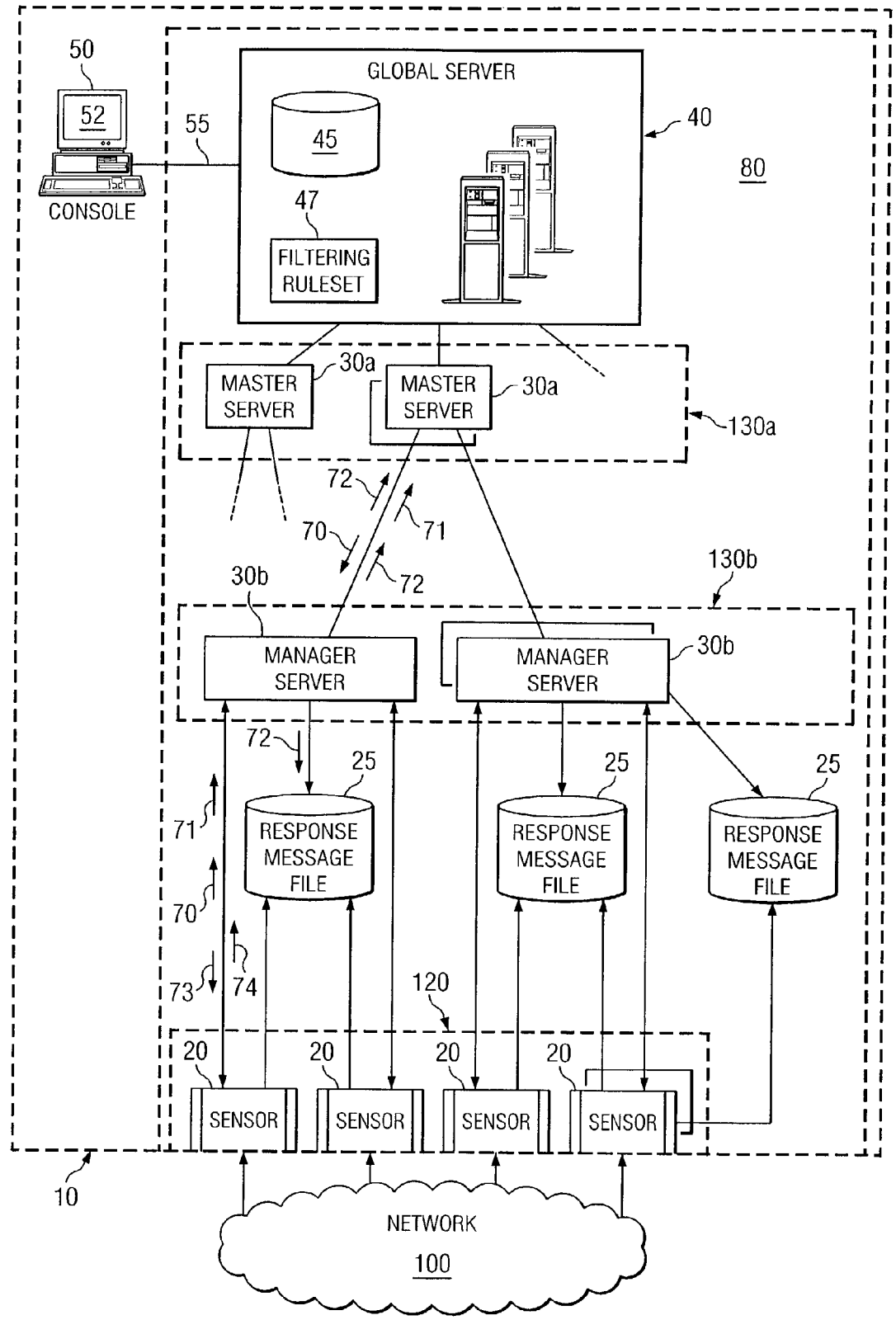
FIG. 1 illustrates a portion of a vertically extensible intrusion detection system according to various embodiments of the present invention.

FIG. 1 illustrates a portion of a vertically extensible intrusion detection system 10 distributed across an enterprise system according to various embodiments of the present invention. The "enterprise" may comprise any business, government, organization, or other large entity that has multiple network channels or ports to an external network 100. For example, a business enterprise may include four ports for external network communications including email, internet, and dialup. In this example, intrusion detection system 10 monitors network communications on the three external ports and attempts to detect, locate, or block an attack on the business. An "attack" may be any malicious, destructive, or suspicious activity communicated from a source external to the portion of the enterprise protected by system 10. Attacks may include viruses, Trojan horses, worms, or any other piece of code or data that represents at least a portion of an unwanted attempt to access the protected portion of the enterprise. Returning to the example, one attack on the business may comprise two different packets, each communicated from the same source but through a different network port. Another attack may comprise two different packets communicated separately over a substantial length of time. These attacks and those of similar nature may not be detected by firewalls, sensors, or other traditional intrusion detection systems.

According to certain embodiments, intrusion detection system 10 comprises multiple logical levels, each level operable to control, monitor, or update lower logical levels. Each level further provides combinatorial detection across a plurality of logically-lower nodes. In short, system 10 provides the enterprise with, at a minimum, vertically and horizontally extensible intrusion detection. Vertically extensible generally means that system 10 may easily add an additional logical level (comprising one or more servers) providing further combinatorial detection across the plurality of logically lower nodes and/or reduced information to levels located logically higher than the added level.

Intrusion detection system 10 comprises a plurality of sensors 20, one or more manager servers 30, global server 40, and console 50. Generally, intrusion detection system 10 may hierarchically couple manager servers 30 such that multiple levels exist. For example, system 10 may include four levels: sensor level 120, manager server lower-level 130b, manager server (or master server) upper-level 130a, and global server 40. Accordingly, intrusion detection system 10 is vertically extensible and dynamically responds to attacks on the enterprise. It will be understood that system 10 comprises any number of levels and, thus, is significantly scaleable across the enterprise. Each level detects an attack on the enterprise system based on communications from lower levels, dynamically responds to the attack, and, when appropriate, automatically communicates response messages to lower levels. It should be understood that the levels represent logical levels as opposed to physical systems and that one or more modules or levels of system 10 may be included in the same computing device. Further, the term "automatically," as used herein, generally means that the appropriate processing is substantially performed by system 10. It should be understood that automatically further contemplates any suitable user interaction with system 10.

The various levels in the hierarchy are located in a portion of internal network 80. Internal network 80 may include one or more intranets, local area networks (LANs), metropolitan area networks (MANs), wide area networks (WANs), or any other suitable enterprise network. Network 80 may, for example, communicate Internet Protocol (IP) packets, frame relay frames, Asynchronous Transfer Mode (ATM) cells, and/or other suitable messages between network addresses. According to particular embodiments, messages between the levels may be in one or more formats including Intrusion Detection Message Exchange Format (IDMEF), binary format, and/or any other appropriate format. Generally, the messages include at least packet flows 70, alert messages 71, response messages 72, processing messages 73, and archival data 74. Each packet flow 70 is a plurality of network packet headers passed up through the levels. According to certain embodiments, packet flow 70 represents a compression of all or a portion of packet information sent from an external source IP address to an internal destination IP address within a set timeframe, normally from the TCP handshake to the TCP reset/timeout. In another embodiment, packet flow 70 may include a compression of subnet communications to other IP addresses or subnets, UDP communications, or ARP communications. Alert messages 71 may be any communication that alerts a higher level of a possible attack such as, for example, IDMEF IDS alerts. Each response message 72 comprises an intrusion signature, rule, or instruction that is used by at least one node to detect, identify, or impede an attack on the enterprise system. As used herein, response messages 72 include static and dynamic response messages. Processing messages 73 comprise commands sent from one node in system 10 to another node such as, for example, from manager server 30 to sensor 20. Archival data 74 generally comprises the full set of information and data associated with an attempt to access internal network 80 and may be created using any appropriate technique. For example, archival data 74 may be created by a "TCPDump" command to include all data communicated between the source IP address to the destination address in binary format. Messages may include any other suitable communication operable to communicated from a node and processed by other nodes or levels. Any or all of the communications may be secured through associating the respective message with a first verification value or digital signature that may be decoded by the receiving node without departing from the scope of this disclosure. Accordingly, each node may be operable to compute a second verification value based on the communication and, in response to the first and second verification values not being equal, refuse the communication.

External network 100 represents any network not protected by intrusion detection system 10. Accordingly, external network communicably couples system 10 and external computer systems. Network 100 may, for example, communicate Internet Protocol (IP) packets, frame relay frames, Asynchronous Transfer Mode (ATM) cells, and/or other suitable information between network addresses. Network 100 may include one or more intranets, local area networks (LANs), metropolitan area networks (MANs), wide area networks (WANs), all or a portion of the Internet, and/or any other communication system or systems at one or more locations. The external client system (not shown) may be any computer, enterprise or non-enterprise, which is trying to access the portion of internal network 80 protected by intrusion detection system 10. As used in this document, the term "computer" is intended to encompass a personal computer, terminal, workstation, network computer, kiosk, wireless data port, wireless telephone, personal digital assistant (PDA), one or more processors within these or other devices, or any other suitable processing device.

As described earlier, intrusion detection system 10 comprises a plurality of levels with each level comprising nodes such as sensors 20, one or more manager servers 30, global server 40, and console 50. In the illustrated example, system 10 comprises server level 120 comprising a plurality of sensors 20, manager server level 130b comprising a plurality of manager servers 30b, and master server level 130a comprising one or more master servers 30a. Each sensor 20 is located at a network port that receives TCP/IP packets or other similar network communications from external network 100. Generally, sensor 20 processes the raw data to detect the presence of an attack and outputs at least the raw data and, when appropriate, a corresponding alert message 71. In certain embodiments, sensor 20 may also generate messages, such as a packet flow 70, based on the raw data received from external network 100.

Sensor 20 may use any suitable detection technique to process incoming data and output the appropriate messages. For example, sensor 20 may use algorithms, signatures, scripts, or any suitable detection or comparison technique to process packet headers, packet payloads, and/or any other incoming data. Sensor 20 could include any hardware, software, firmware, or combination thereof operable to receive data from external sources via network 100, process the raw network data, and communicate results to higher levels. For example, sensor 20 may comprise a computer, server, lower-level intrusion detection system, firewall, or any module written in any appropriate computer language such as, for example, C, C++, Java, Perl, and others. It will be understood that while sensor 20 is illustrated as a single multi-tasked module, the features and functionality performed by this engine may be performed by multiple modules such as for example, a sensor module and a packet flow generation module. Additionally, to help ensure that each port is properly monitored, each sensor 20 may be associated with a redundant slave sensor, illustrated as slave sensor 20b, which is operable to assume substantially all of the functionality of the sensor 20 in the event of any failure of sensor 20.

In one embodiment, sensor 20 processes each incoming packet according to a response message file 25. Response message file 25 may include XML tables, flat files, CSV files, SQL statements, relational database tables, HTML pages, or any other appropriate data structure to store at least one response message 72. System 10 may include one response message file 25 for use by a plurality of sensors 20 or one response message file 25 per sensor 20, as appropriate. In other words, response message file 25 may be separated into multiple tables, consolidated into one table, or stored inside sensor 20, without departing from the scope of the disclosure. As described in more detail in FIG. 3C, upper levels of system 10 dynamically generate response messages 72 based on a detected attack and communicate these response messages 72 to the appropriate response message files 25 through manager servers 30. Each response message file 25 may further include static response messages 72. Static response messages 72 may be stored in a database, encrypted with a hash value, and communicated to identifiable portions of entire system 10 such as, for example, all sensors 20 behind enterprise firewalls.

Manager server 30 represents any hardware or software module that controls or monitors one or more servant nodes. In one example, each manager server 30 includes a correlation engine 31 and a correlation ruleset 33, described in more detail in FIGS. 3A through 3C, for receiving and correlating data from lower-level nodes. Generally, through correlating and aggregating lower-level communications, manager server 30 is capable of detecting an attack occurring across multiple servant nodes and dynamically responding to such a threat. The servant nodes may include sensors 20 or lower-level manager servers 30. For readability purposes, the term master server may be used to describe an upper-level manager server 30 which has other manager servers 30 as servant nodes. Normally, one or more lowest-level manager servers 30 control and monitor a plurality of sensors 20. In certain embodiments, each low-level manager server 30 may receive raw data from sensors 20, such as in binary format, and generate packet flow 70 for use by upper-level manager servers 30.

According to certain embodiments, manager server 30 comprises a general-purpose personal computer (PC), a Macintosh, a workstation, a Unix-based computer, a server computer, or any other suitable processing device. Additionally, to make system 10 more robust, each manager server 30 may be associated with a redundant manager server, illustrated as manager server 30b, which is operable to assume substantially all of the functionality of manager server 30 in the event of a failure of the associated manager server 30. Although FIG. 1 provides one example of a server 30 that may be used with the invention, system 10 can be implemented using computers other than servers, as well as a server pool. Manager server 30 may include any hardware, software, firmware, or combination thereof operable to receive communications from lower levels, appropriately process the communications, and dynamically respond. According to one embodiment, manager server 30 may comprise a web server. One function of manager server 30 might be to allow an external client to send or receive content over or from the Internet using a standard user interface language such as, for example, the Extensible Markup Language (XML) or Hypertext Markup Language (HTML). Manager server 30 would then include sensors 20 that can accept data from the external client via a web browser (e.g., Microsoft Internet Explorer or Netscape Navigator) and return the appropriate HTML responses.

At the highest logical level, system 10 comprises global server 40. Generally, global server 40 is operable to receive alert messages 71, response messages 72, and archival data 74 from each node in system 10 and ensure that response messages 72 are distributed to the appropriate lower nodes. It should be understood that global server 40 may further include functionality similar to that described in regard to manager server 30. For example, global server 40 may communicate a first response message 72 to every sensor 20 via the manager server 30 levels. In another example, global server 40 may determine that only a portion of sensors 20 would benefit from a second response message 72 and, thus, communicates second response message 72 to only the appropriate manager servers 30 in the hierarchy. Global server 40 may comprise a general-purpose personal computer (PC), a workstation, a Unix-based computer, a server computer, or any other suitable device. Although FIG. 1 provides one example of global server 40 that may be used with the invention, system 10 can be implemented using computers other than servers, as well as a server pool. Global server 40 may include any hardware, software, firmware, or combination thereof operable to process control and monitor system 10 at the highest logical level.

Global server 40 may include an archive database 45 to store the raw archival data 74 for later processing, retrieval, or searches. Archive database 45 may include any memory or database module and may take the form of volatile or non-volatile memory comprising, without limitation, magnetic media, optical media, random access memory (RAM), read-only memory (ROM), removable media, or any other suitable local or remote memory component. In one embodiment, archive database 45 comprises stored IP information such as, for example, TCPDump data corresponding to each packet flow 70. Archive database 45 may include any other data such as, for example, historical operator commands or response messages 72 previously communicated to lower nodes without departing from the scope of this disclosure. Global server 40 may include a global correlation engine 31 that is further operable to process archive database 45 to detect the presence of a substantially long-term or multi-staged attack that had previously gone undetected by sensors 20 and manager servers 30 using packet flows 70. Although FIG. 1 illustrates archive database 45 as residing internally to global server 40, archive database 45 may reside externally or at any other location or locations accessible by global server 40.

Global server 40 further may comprise a filtering ruleset 47. Filtering ruleset 47 allows system 10 to reduce the analyst's workload through filtering the information communicated to console 50. Ruleset 47 comprises instructions, algorithms, or any other directive which largely controls the information communicated to console 50. Although FIG. 1 illustrates filtering ruleset 47 as residing internally to global server 40, filtering ruleset 47 may reside externally at one or more manager servers 30 or at console 50 without departing from the scope of this disclosure.

Intrusion detection system 10 may communicate the resulting information to console 50 so that a user, such as a supervisor or administrator, may view the desired packet flows 70 and alert messages 71. System 10 may filter the communications to console 50 based on the filtering ruleset 47. Console 50 also allows the communication of static response messages 72 to global server 40 for distribution to the appropriate lower nodes. Console 50 may represent any computer that may comprise input devices, output devices, mass storage media, processors, memory, or other components for receiving, processing, storing, and/or communicating information. It will be understood that there may be any number of consoles 50 coupled to network 100 such as, for example, one or more operator or analyst consoles 50 and a supervisor console 50.

Console 50 is communicably connected to global server 40 via communications channel 55, which may be direct-line, encrypted, or any other type of substantially secure communication channel. The security of communications channel 55 helps ensure that any static response messages 72 that global server 40 receives via channel 55 is from the appropriate console 50—not from an external or unauthorized source. According to certain embodiments, communications channel 55 may utilize Secure Sockets Layer (SSL) technology. SSL is a transport level technology for authentication and data encryption between two nodes on a network. SSL negotiates point-to-point security between console 50 and global server 40. It sends data over a "socket", a secure channel at the connection layer existing in most TCP/IP applications. Information being transmitted via communications channel 55 is encrypted and only the respective console 50 and global server 40 have the key and, therefore, the ability to understand and decipher transferred information. Console 50 may be, alternatively or additionally, linked to one or more master servers 30 without departing from the scope of this disclosure.

Figure 4:
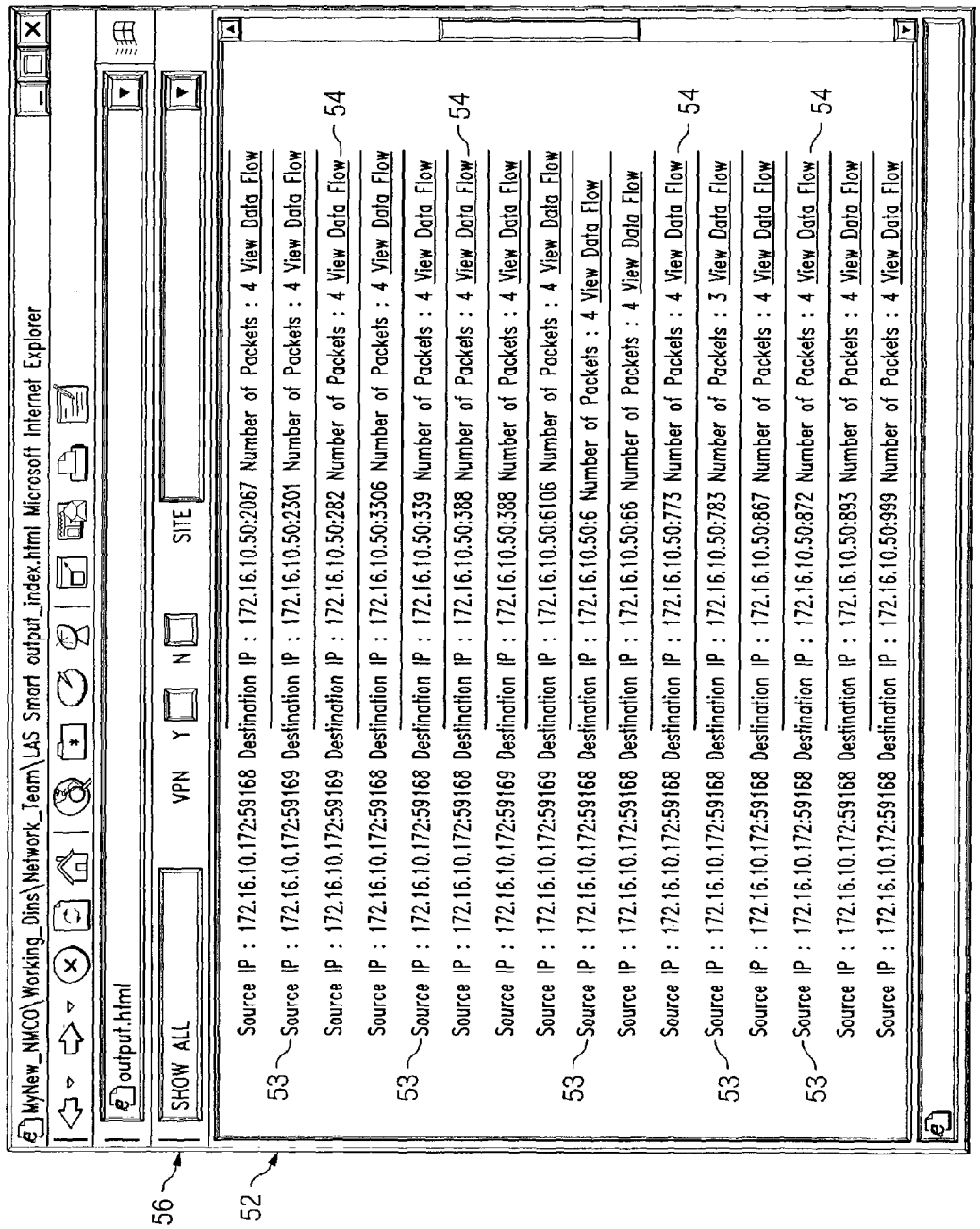
FIG. 4 illustrates an embodiment of a graphical user interface in accordance with the system of FIG. 1.

Console 50 may include a graphical user interface (GUI) 52 that tailors and filters the data presented to the user, illustrated in more detail in FIG. 4. Generally, GUI 52 provides the user of console 50 with an efficient and user-friendly presentation of data and events occurring in system 10. GUI 52 may open a secure shell (SSH) tunnel to provide additional secure communications between console 50 and the other portions of system 10. GUI 52 may comprise a plurality of displays having interactive fields, pull-down lists, and buttons operated by the user. In one example, GUI 52 presents the descriptive information of each packet flow 70 to the user and conceals the remaining information in order to reduce visual clutter. Then, upon receiving a request from the user, GUI 52 expands the visual representation of packet flow 70 to further display the packet headers and payloads to the user. GUI 52 may include multiple levels of abstraction including groupings and boundaries. It should be understood that the term graphical user interface may be used in the singular or in the plural to describe one or more graphical user interfaces and each of the displays of a particular graphical user interface. Further, GUI 52 contemplates any graphical user interface that processes information from vertically extensible intrusion detection system 10, or other appropriate system, and efficiently presents the information to a user.

In one aspect of operation, manager server 30 communicates processing message 73 to sensor 20 to ensure that sensor 20 operates according to a particular set of criteria such as, for example, periodically polling response message file 25 for current and expired response messages 72. Accordingly, sensor 20 monitors the respective port in network 80 when the port receives a request to initiate communications from an external computer via external network 100. Once the communication session is initiated, sensor 20 begins processing substantially all of the data communicated from the external system based on response message file 25. After processing the packets, sensor 20 communicates the raw IP archival data 74, in binary format, to low-level manager server 30. If sensor 20 determines that one or more packets represents a portion of an attack on the enterprise, then sensor 20 generates an alert message 71. In certain embodiments, sensor 20 may combine a plurality of packets into packet flow 70 based on any appropriate criteria such as, for example, source address, destination address, or packet payload and assign a priority to the generated packet flow 70. For example, to reduce the data processed by upper levels, sensor 20 may only compress a plurality of packets to packet flow 70 if one of the packets represents at least a portion of an attack. In another example, sensor 20 may combine all plurality of packets into packet flows 70. One example packet flow 70 comprises descriptive information, packet headers, and the assigned priority and is in IDMEF format. The descriptive information may include the count of packets in the packet flow, a timestamp, a class, or any other suitable data. Sensor 20 then associates the alert message 71 with packet flow 70 and communicates packet flow 70 and the associated alert message 71 to the supervising low-level manager server 30. The term "associated," as used herein, may mean incorporated into, linked with, or any other logical or physical relation.

Manager server 30 receives the data, either binary or packet flow 70, from sensors 20. If the data is received in binary format, then low-level manager server 30 reduces the data to packet flows 70 based on any appropriate criteria such as, for example, source address, destination address, or packet payload. Once packet flows 70 are received or generated, manager server 30 correlates packet flows 70 with any associated alert messages 71. Based on this correlation, manager server 30 assigns a priority to packet flow 70. Manager server 30 may also assign a priority to packet flow 70 if it determines that packet flow 70 represents a relatively uncommon communication. Further, manager server 30 may associate two or more flows 70 into a combined (aggregated) flow 70 based on any suitable criteria such as, for example, a correlation ruleset 33, source address, alert message 71, or flow priority. Aggregation allows system 10 to detect and respond to substantially long-term or multi-port attacks. Manager server 30 may then communicate combined flow 70 to higher levels, comprising master servers and global server 40, based on the flow priority. Once received, the appropriate upper level server 30 or 40 generates one or more HTML pages, based on filtering ruleset 47, for communication to console 50.

If any manager server 30 (or global server 40) detects that one or more packet flows 70 represent an attack on the enterprise, the respective server 30 or 40 automatically generates a new response message 72 for impeding the attack and assigns a higher priority to the combined flow 70. Manager server 30 dynamically distributes the generated response message 72, comprising a new signature or rule, to the lower and higher nodes. To reduce system overhead, this distribution may not be to every node in system 10. Instead, manager server 30 may communicate response message 25 to certain nodes based on the respective port's communication type or any other suitable criteria. As described above, manager server 30 may also attach a digital signature or other verification value to response message 72 to help ensure the security of the message. Once the lowest manager server 30 receives response message 72, it communicates the dynamic response message 72 to appropriate response message file 25 for one or more sensors 20. Manager server 30 may also communicate a new processing message 73 to each sensor 20. Again, processing message 73 represents processing instructions for sensor 20 such as, for example, to poll response message file 25 at certain time increments. Based on processing message 73, sensor 20 retrieves the dynamically generated response message 72 from response message file 25 and impedes or detects similar future attacks.

The preceding description details various techniques for detecting attacks on an enterprise system using vertically extensible intrusion detection system 10. While these techniques have been described in particular arrangements and combinations, system 10 contemplates using any appropriate combination and ordering of these operations to provide for vertical scalability using manager servers 30.

FIG. 2 illustrates an embodiment of a sensor 20 in accordance with system 10. As described above, while sensor 20 is illustrated as a single module, the features and functionalities performed by these modules may be performed by multiple modules. Sensor 20 may be any hardware, software, firmware, logic, or combination thereof operable to process communications from network 100 based on response message file 25. Sensor 20 may be written in any appropriate computer language such as, for example, C, C++, Java, Assembler, and others. Indeed, system 10 contemplates that the processes and functionality of manager servers 30 are substantially independent of the architecture of sensors 20.

Generally, sensor 20 processes input from network 100 and outputs packet flow 70, TCPDump archival data 74, and, when appropriate, IDMEF alert messages 71. As described above, sensor 20 may also assign a priority to packet flow 70. According to certain embodiments, system 10 comprises response message file 25, processing ruleset 26, and IDMEF plug-in 27 for each sensor. Ruleset 26 comprises instructions, algorithms, processing messages 73, or any other directive which largely controls the processes of sensor 20. Ruleset 26 allows system 10 to incorporate and control a wide array of sensors 20 without substantial redesign or modification. It should be understood that while processing ruleset 26 is illustrated as external to sensor 20, ruleset 26 may be internal without departing from the scope of the disclosure. IDMEF plug-in 27 is an example plug-in that comprises instructions, algorithms, or any other directive that directs sensor 20 to output the proper format of certain data such as, for example, IDMEF. Any formatting plug-in may be used in place of or in combination with IDMEF plug-in 27 without departing from the scope of this disclosure.

In one aspect of operation, manager server 30 communicates processing message 73 to processing ruleset 26. One example of processing message 73 stored in processing ruleset 26 comprises a command instructing sensor 20 to poll response message file 25 at regular intervals for updates and expirations of response messages 72. Another example of processing message 73 comprises a directive to sensor 20 to reset or initialize itself to clear out old data or processes. Yet another example of processing message 73 comprises an instruction to first sensor 20 to shutdown and allow slave sensor 20 to assume the processes of first sensor 20. This example may allow system 10 to dynamically upgrade or replace first sensor 20 without a loss of protection at the respective port. Further examples include the processing message comprising an instruction to the sensor to poll the response message file to intercept one or more of the plurality of packets or to close an associated port.

Sensor 20 monitors incoming data from external network 100 based on processing ruleset 26. Sensor 20 processes the data using response messages 72 (or rules) stored in response message file 25. In response to detecting an attack, identified by one or more response messages 72, sensor 20 generates an alert message 71 and communicates the generated alert message 71 to its respective manager server 30. Sensor 20 may also generate a packet flow 70, using the various communications from external network 100, and assign a priority to packet flow 70. Whether an attack is detected or not, sensor 20 communicates the received data up the hierarchy, via manager server 30, in either binary format or as packet flow 70 for subsequent analysis.

FIGS. 3A through 3C illustrate various embodiments of correlation engine 31 in accordance with system 10. It will be understood by those skilled in the art that correlation engine 31 may reside locally in manager server 30, remotely on another computer server, or distributed across servers. It will be further understood that while correlation engine 31 is illustrated as a single module, the features and functionalities performed by these modules may be performed by multiple modules. Correlation engine 31 may be any software or logic operable to process multiple communications from servant nodes. Correlation engine 31 may be written in any appropriate computer language such as, for example, C, C++, Java, Assembler, and others.

FIGS. 3A-B illustrate various embodiments of correlation engine 31 operable to dynamically generate rules or signatures (for incorporation in response messages 72) and distribute the new rules in accordance with system 10. Generally, correlation engine 31 receives data from servant nodes, processes the data, and dynamically generates response messages 72. Correlation engine 31 then communicates at least a portion of the data up the system 10 hierarchy to upper-level manager servers 30 or global server 40 and distributes the response messages 72 to the appropriate servant nodes.

Correlation engine 31 is communicably linked with a correlation ruleset 33 and a security table 34. Correlation ruleset 33 comprises instructions, algorithms, or any other directive that is used by correlation engine 31 to properly process packet flows 70 and alert messages 71. Ruleset 33 allows manager server 30 to quickly change processing rules without extensive redesign or modification. This adaptability allows easier scalability of system 10. Security table 34 may be of any suitable format comprising XML tables, flat files, comma-separated-value (CSV) files, SQL tables, relational database tables, and others. In one embodiment, security table 34 is a multidimensional data structure that comprises at least one signature or response message 72.

In one aspect of operation, illustrated in FIG. 3A, correlation engine 31 detects an attack through a number of ways such as, for example, receiving alert messages 71 from servant nodes or aggregating packet flows 70 from multiple servant nodes to determine a multi-port or multi-staged attack. In the first example, correlation engine 31 receives a plurality of packet flows 70 and alert messages 71 from servant nodes. Based on correlation ruleset 33, correlation engine 31 associates a first alert message 71 with a first received packet flow 70. In certain embodiments, correlation engine 31 associates alert message 71 with packet flow 70 using any suitable criteria such as, for example, source address or destination address. Based on this association, correlation engine 31 may dynamically generate a new response message 72 and distribute response message 72 to the appropriate servant nodes. In a second example, correlation engine 31 efficiently and reliably analyzes data from multiple servant nodes through aggregation. Correlation engine 31 receives at least two packet flows 70 from servant nodes and then combines the first and second flows 70 into third packet flow 70. Based on this aggregation, correlation engine 31 processes the combined data to detect an attack that is spread among the servant nodes. In this way, system 10 is can easily protect numerous ports. Further, this technique of aggregation provides system 10 with horizontally extensibility through easily adding sensors to new ports without significant redesign or modification.

In another aspect of operation, illustrated in FIG. 3B, after correlation engine 31 aggregates first and second packet flows 70 into third packet flow 70, correlation engine 31 assigns a priority to third packet flow 70 and passes third packet flow 70 up the hierarchy based on the priority. For example, correlation engine 31 compares the first and second priority from the first and second flows 70. Then, in response to the first priority not being less than the second priority, correlation engine 31 assigns the first priority to the third packet flow 70. Or, in response to the second priority being greater than the first priority, correlation engine 31 assigns the second priority to the third packet flow 70. In a second example, correlation engine 31 computes a priority of the third packet flow 70 based, at least in part, on alert message 71 or a detected uncommon event and assigns the computed priority to the third packet flow 70. It should be understood that correlation engine 31 may not communicate packet flow 70 to an upper-level manager server 30 if the priority of packet flow 70 is not high enough.

FIG. 3C illustrates two correlation engines 31*a* and 31*b*, each residing on manager server 30*a* or 30*b*, respectively. The use of multiple manager servers 30, or correlation engines 31, allows system 10 to create a hierarchy spanning internal network 80. As desired, system 10 may easily add additional manager servers 30 to handle additional workloads or network ports. In this embodiment, manager server 30*a* is logically higher in the system 10 hierarchy than manager server 30*b*. Accordingly, manager server 30*a* may be described as master server 30*a* to aid readability.

Master server 30*a* is communicably linked to manager server 30*b*. Manager server 30*b* is communicably linked to two servant nodes, first and second sensors 20. It will be understood that this is for illustrative purposes only and that master server 30*a* may include any number of servant nodes, comprising other manager servers 30 or sensors 20 (not shown). As well, manager server 30*b* may include any number of additional servant nodes, comprising manager servers 30 or sensors 20, without departing from the scope of this disclosure.

Each illustrated server 30 comprises database 32*a* and 32*b*, respectively. Database 32 may include any memory or database module and may take the form of volatile or non-volatile memory comprising, without limitation, magnetic media, optical media, random access memory (RAM), read-only memory (ROM), removable media, or any other suitable local or remote memory component. That is, server 30 may include non-transitory machine-accessible and readable memory. In this embodiment, database 32 comprises a correlation ruleset 33 and a security table 34, described in more detail in FIG. 3A. Database 32 may include any other data such as, for example, an archival database table or other suitable data.

In one aspect of operation, each sensor 20 processes data from external network 100 as described in FIG. 2. Each sensor 20 processes the data and outputs the data in binary format. Each sensor 20 may also reduce its respective packets to packet flow 70 and communicates it to manager server 30*b*. If sensor 20 detected an abnormal or problematic packet, then sensor 20 may, alternatively or in combination, create an alert message 71, which is also communicated to manager server 30*b*, or assign a priority to packet flow 70.

Once manager server 30*b* retrieves the data from first and second sensor 20, manager server 30*b* processes the information for possible distribution to upper levels. In one embodiment, manager server 30*b* retrieves binary data output from each sensor 20 and reduces portions of the data into packet flows 70. In another embodiment, manager server 30*b* receives first and second packet flow 70 from the first and second sensor 20, respectively. Correlation engine 31*b* processes the packet flows 70 based on correlation ruleset 33 to determine if any of the data represents at least a portion of an attack on the enterprise. This processing may include correlating one alert message 71 with one packet flow 70, aggregating two or more packet flows 70 into a third packet flow 70, or analyzing the priority of one or more of the packet flows 70. Correlation engine 31*b* may communicate the packet flow 70 to master server 30*a* if an attack is detected, the priority of packet flow 70 is high enough, or based on any other suitable criteria. If correlation engine 31*b* detects a portion of an attack, then manager server 30*b* may dynamically generate a response message 72 based on the alert message 71 or the packet flow 70. In this case, manager server 30*b* would store the new response message 72 in security table 34 and communicate new response message 72 to the appropriate sensor or sensors 20. Manager server 30*b* also may communicate response message 72 to master server 30*a* in order that the response message 72 may be distributed as appropriate. According to certain embodiments, manager server 30*b* may also generate an HTML page based on the processing of packet flows 70. Each HTML page may be associated with one or more packet flows 70 and communicated to console 50 via master server 30*a*.

Master server 30*a* receives the plurality of communications from its servant nodes, comprising manager server 30*b*. Correlation engine 31*a* processes the packet flows 70 based on correlation ruleset 33 to determine if any of the data represents at least a portion of an attack on the enterprise that was not detected by manager server 30*b*. This processing may include correlating one alert message 71 with one packet flow 70, aggregating two or more packet flows 70 into a third packet flow 70, or analyzing the priority of one or more of the packet flows 70. Correlating engine 31*a* may include additional functionality to ensure proper control and monitoring of servant nodes, comprising manager server 30*b*.

FIG. 4 illustrates an example embodiment of a graphical user interface (GUI) 52 in accordance with system 10. As described above, GUI 52 provides an efficient and user-friendly presentation of data and events occurring in system 10 to a user of console 50. GUI 52 may comprise a plurality of displays having interactive fields, pull-down lists, and buttons operated by the user. GUI 52 may comprise a web browser (e.g., Microsoft Internet Explorer or Netscape Navigator) that receives input from system 10 and presents the appropriate HTML pages to console 50. While GUI 52 is described in terms of Hypertext Markup Language (HTML), GUI 52 may be developed using any user interface language such as, for example, Extensible Markup Language (XML) or JavaScripts. It will be understood by those skilled in the art that GUI 52 may reside locally in console 50, remotely on another computer server, or distributed across computers. It will be further understood that while GUI 52 is illustrated as a single module, the features and functionalities performed by these modules may be performed by multiple modules such as, for example, a web browser and a filtering module.

GUI 52 displays visual representations of one or more packet flows 70 based, in part, on filtering ruleset 47. GUI 52 further allows a user to interactively customize the view based on multiple groupings 56 or boundaries such as, for example, VPN groupings, firewall groupings, sites or other geographic locations, communication types, trust levels of ports, or any other appropriate level of abstraction. For example, VPN groupings may allow the user to select only those packet flows 70 received from a VPN (Virtual Private Network) or non-VPN connection and firewall groupings may allow the user to select only those packet flows 70 received from behind or beyond a selected firewall. These levels of abstraction reduce the visual clutter and allow for more efficient viewing and detecting of possible attacks on system 10. The user may select one or more of groupings 56 to organize (sort, filter, or any other appropriate processing) information as desired.

Accordingly, in certain embodiments, GUI 52 comprises a browser window that displays a parent HTML page comprising descriptive information 53 and link 54 to a child HTML page for each packet flow 70. These HTML pages are generated by system 10 on any computer or server in system 10 comprising console 50, global server 40, or manager server 30. Descriptive information 53 presents relevant identifying data for each packet flow 70. For example, descriptive information 53 may include source address, destination address, grouping information, the number of packets included in the respective packet flow 70, or any other information suitable for identifying a particular packet flow 70. Link 54 allows GUI 52 to conceal the packet headers and packet payloads of each packet flow 70 from the user of console 50. This provides a much cleaner interface to the user, thereby resulting in an improved and/or quicker analysis. Each link 54 may be colored, such as red or green, to represent the priority of packet flow 70. Further the data displayed in GUI 52 may be sorted by priority or any other criteria using a hash table 75, illustrated in FIG. 5.

FIG. 5 illustrates an embodiment of hash table 75 used by graphical user interface 52 in accordance with system 10. While described in terms of global server 40, hash table 75 may reside on one or more computers or servers in system 10 comprising console 50 or manager server 30. Generally, hash table 75 allows system 10 to efficiently sort packet flows 70 without the many resources that would be needed to sort the vast amount of data included in each packet flow 70. For example, GUI 52 may use hash table 75 to sort packet flows 70, for display to the user of console 50, using any criteria. Hash table 75 comprises hash values 76 and arrays 77. Hash value 76 is any value that uniquely identifies packet flow 70 and may be computed using any hashing algorithm such as, for example, MD-5. Each hash value 76 is associated with one array 77. Each array 77 comprises substantially all of packet flow 70 information comprising descriptive information, packet headers, packet payloads, and others.

In one aspect of operation, global server 40 creates one unique hash value 76 for each packet flow 70 received from lower nodes. Each packet flow 70 may be stored in array 77 for easier processing by global server 40. Global server 40 then sorts hash table 75 using any suitable criteria and generates the HTML pages based on the sorted hash table 75. In another embodiment, global server 40 communicates the sorted hash table 75 to GUI 52 to allow for a more dynamic generation of sorted HTML pages.

FIG. 6 is a flowchart illustrating a method 600 for aggregating a plurality of flows in accordance with vertically extensible intrusion detection system 10. In certain embodiments, method 600 enables system 10 to easily scale manager servers 30, while detecting attacks in internal network 80. Method 600 may be described with respect to modules in system 10 of FIG. 1, but any other suitable system may use method 600 without departing from the scope of this disclosure.

Data is received from external network 100 at a first sensor 20 in step 602. At step 604 data is received from external network 100 at a second sensor 20. As described above, the data is generally received from computers residing outside of internal network 80, which is the network protected by system 10. Each sensor 20 processes the received raw data according to any suitable intrusion detection technique at step 606. At decisional step 608, if an attack is detected, execution proceeds to step 610. At step 610, each sensor 20 that detected an attack communicates one or more alert messages 71 to low-level manager server 30. Next, or if an attack was not detected at decisional step 608, sensor 20 communicates the raw data to low-level manager server 30 using any appropriate format. For example, system 10 contemplates sensor 20 communicating a plurality of packets in binary format (such as TCPDump) or reduced to packet flow 70. Based on the type of sensor 20, sensor 20 either outputs the data in binary format at step 612 or outputs the data as packet flow 70 at step 616. In certain embodiments, in step 612 sensor 20 may output the data in binary format to a binary file, the binary file operable to be accessed by low-level manager server 30. At step 614, low-level manager server 30 either receives the binary output from sensor 20 or retrieves the binary output from a binary file (not shown). Once low-level manager server 30 receives the binary output, manager server 30 combines the binary data into packet flow 70 based, at least in part, on source IP address, destination IP address, priority, packet payload, or any other suitable criteria. Returning to step 616, sensor 20 outputs the data as packet flow 70 by communicating it to low-level manager server 30. At step 618 manager server 30 receives packet flows 70 for use by correlation engine 31. For archival purposes, sensor 20 communicates binary archival data 74 to global server 40 via the manager server 30 hierarchy for storage in archive database 45 at step 622.

Once sensors 20 have finished processing the data and the data is received at low-level manager server 30, manager server 30 correlates alert messages 71 with packet flows 70 based on source IP address, destination IP address, or any other suitable criteria. At step 626, correlation engine 31 aggregates two or more plurality of packets (or packet flows 70) into third packet flow 70. Once third packet flow 70 is generated, manager server 30 processes the third packet flow 70 to detect an attack that is occurring across at least first and second sensor 20. If an attack is detected at decisional step 629, then low-level manager server 30 communicates an alert message 71 to the next level in the hierarchy of system 10. For example, the next level may be an upper-level manager server 30 or global server 40. Method 600 then proceeds to steps 631 to 634 where a priority is assigned to packet flows 70 being processed by manager server 30.

At decisional step 631, manager server 30 determines if any of the former packet flows 70, which were aggregated into third packet flow 70, were assigned a priority by a servant node. At step 632, if one of the former packet flow 70 were assigned a priority, manager server 30 may then assign the highest priority from the former packet flows 39 to third packet flow 70. Alternatively or in combination, manager server 30 may assign a new priority to third packet flow 70 at step 634 based on a newly detected attack using a security table or correlation ruleset. At step 636, manager server 30 determines a verification value, such as a hash value, for third packet flow 70 and any associated communications such as alert message 71. The now secure third packet flow 70 is communicated to an upper level in the hierarchy such as master server 30, based on the priority assigned third packet flow 70. For example, low-level manager server 30 may not communicate third packet flow 70 to master server 30 if the priority is not high enough.

FIG. 7 is a flow chart illustrating a method 700 for dynamic rule generation in accordance with vertically extensible intrusion detection system 10. Generally, method 700 provides system 10 with the ability to be vertically extensible or scalable through dynamically responding to attacks or threats across multiple ports.

Data is received from external network 100 at a first servant node in step 702. At step 704, data is received from external network 100 at a second servant node. At step 706, manager server 30 receives and aggregates first and second packet flow 70a and 70b, respectively, into a third packet flow 70c based on source address, destination address, priority, or any other suitable criteria. Manager server 30 then dynamically processes aggregated third packet flow 70c to detect if third packet flow 70 represents a multi-stage or multi-port attack on an internal network 80. Manager server 30 may process third packet flow 70c according to any suitable intrusion detection techniques. If an attack is not detected at decisional step 709, then execution ends. Otherwise, execution proceeds to step 710 where manager server 30 automatically generates a response message 72 in response to the attack detected in the processing at step 708. At step 712, manager server 30 associates a generation date with the generated response message 72. Generally, this generation date will allow a system 10 to discard older response messages 72.

Once response message 72 has been dynamically generated, manager server 30 distributes the new response message 72 to all appropriate lower nodes and to the upper levels in the system 10 hierarchy in steps 714 through 722. If one or more of the servant nodes is a sensor 20 at decisional step 714, then manager server 30 automatically communicates response message 72 to the appropriate response message file 25 for sensor 20. At step 718, manager server 30 communicates a processing message 73 to sensor 20 in order that sensor 20 appropriately receives and utilizes response message 72. Manager server 30 automatically communicates response message 72 to all the remaining servant nodes which may include other manager server servers 30 in step 720. At step 722, manager server 30 automatically communicates response message 72 to the upper levels in a system 10 hierarchy. It should be understood that one or more of these upper-level manager servers 30 may distribute the newly generated response message 72 to any respective lower nodes as appropriate.

FIG. 8 is a flow chart illustrating a method 800 for generating a user interface using sorted packet flows 70 for use by graphical user interface (GUI) 52. Generally, method 800 provides GUI 52 with a user-friendly, graphically efficient view of the vast amounts of data received across the enterprise and processed by system 10. While method 800 is described using global server 40, it will be understood that any appropriate module in system 10 may be used. Further, any other suitable system may use method 800 without departing from the scope of this disclosure.

Method 800 begins at step 802 where global server 40 receives a plurality of packet flows 70 from all lower nodes in system 10. Global server 40 generates a hash table 75 based on the received packet flows 70, as described in more detail in FIG. 5. At step 806, global server 40 sorts hash table 75 using any appropriate criteria. Global server 40 then generates a parent HTML page for presentation to the console 50 via GUI 52 in step 808. Execution then proceeds to steps 810 through 826, where global server 40 generates the links for child HTML pages for the various packet flow 70 received at global server 40.

At step 810, global server 40 retrieves the first hash value 76 in the sorted hash table 75. Global server 40 uses the retrieved hash value 76 to retrieve the associated packet flow 70 in the array 77 at step 812. At step 814, global server 40 extracts the source address, destination address, and determines the number of packets for packet flow 70. Once this information is extracted, global server 40 generates a link on the parent HTML page for the respective packet flow 70. At step 818, global server 40 may alternate the color of the link based on the priority assigned to the respective packet flow 70. Global server 40 then generates a child HTML file or page for packet flow 70. At step 822 the extracted data is stored in the child HTML page. Global server 40 then stores the packet flow 70 payloads in the child HTML file. At decisional step 826, global server 40 determines if there are more hash values 76 in hash table 75. If there are more hash values 76 in hash table 75, then execution returns to step 812 and generates a new link in child HTML page for the new associated packet flow 70. Otherwise, if all the desired hash values 76 have been processed, then execution ends.

The preceding flowcharts focus on the operation of example vertically extensible intrusion detection system 10 described in FIG. 1, as this diagram illustrates functional elements that provide for the preceding scaleable techniques. However, as noted, system 10 contemplates using any suitable combination and arrangement of functional elements for providing these operations, and these techniques can be combined with other techniques as appropriate. Further, various changes may be made to the preceding flowcharts without departing from the scope of this disclosure.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶ 6 of 35 U.S.C. §112 as it exists on the date of filing hereof unless "means for" or "step for" are used in the particular claim.

What is claimed is:

1. Non-transitory machine-accessible and readable media comprising software that, when executed by a computer, operates to:
    receive a plurality of packet flows from a plurality of sensors at a plurality of ports between an external network and an internal network;
    aggregate the plurality of packet flows into an aggregated packet flow;
    dynamically process the aggregated packet flow to detect if one or more packets in the plurality of packet flows represent an attack on the internal network;
    automatically generate a response message in response to the attack, the response message operable to identify or impede the attack; and
    automatically communicate the response message to a response message file, the plurality of sensors operable to process packets received at the plurality of ports from the external network according to the response message file.

2. The non-transitory machine-accessible and readable media of claim 1, wherein the software is further operable when executed to communicate one or more processing messages to one or more of the plurality of sensors.

3. The non-transitory machine-accessible and readable media of claim 2, the one or more processing messages to one or more of the plurality of sensors each consisting of one of the following:
    an instruction to the sensor to poll the response message file;
    an instruction to the sensor to reset;
    an instruction to the sensor to shutdown;
    an instruction to the sensor to intercept one or more packets; and
    an instruction to the sensor to close an associated port.

4. The non-transitory machine-accessible and readable media of claim 1, wherein the software is further operable when executed to associate a generation date to the response message, the generation date indicating a date of the automatic generation of the response message.

5. The non-transitory machine-accessible and readable media of claim 4 wherein the software is further operable when executed to:
compare the generation date to an aging date, the aging date representing a past date that precedes a current date by a predetermined number of days; and
in response to the generation date of the response message preceding the aging date, automatically remove the associated response message from the response message file.

6. The non-transitory machine-accessible and readable media of claim 1, wherein the software is further operable when executed to:
compute a verification value for the generated response message; and
associate the verification value with the generated response message.

7. The non-transitory machine-accessible and readable media of claim 6, wherein the plurality of sensors are operable to verify the response message based, at least in part, on the verification value.

8. The non-transitory machine-accessible and readable media of claim 1, wherein the software is further operable when executed to communicate the response message to each of a plurality of response message files, each response message file comprising at least one response message and being associated with at least one sensor.

9. The non-transitory machine-accessible and readable media of claim 1, wherein the software is further operable when executed to detect if one or more packets in the plurality of packet flows is a stage of the attack, the attack comprising a plurality of stages.

10. The non-transitory machine-accessible and readable media of claim 9, wherein the generated response message comprises a first response message, the first response message operable to identify or impede the detected stage of the attack, and the software is further operable when executed to:
automatically generate a second response message, the second response message operable to identify or impede later stages of the attack; and
automatically communicate the second response message to the response message file.

11. A method comprising:
receiving a plurality of packet flows from a plurality of sensors at a plurality of ports between an external network and an internal network;
aggregating the plurality of packet flows into an aggregated packet flow;
dynamically processing the aggregated packet flow to detect if one or more packets in the plurality of packet flows represent an attack on the internal network;
automatically generating a response message in response to the attack, the response message operable to identify or impede the attack; and
automatically communicating the response message to a response message file, the plurality of sensors operable to process packets received at the plurality of ports from the external network according to the response message file.

12. The method of claim 11 further comprising communicating one or more processing messages to one or more of the plurality of sensors.

13. The method of claim 12, the one or more processing messages to one or more of the plurality of sensors each consisting of one of the following:
an instruction to the sensor to poll the response message file;
an instruction to the sensor to reset;
an instruction to the sensor to shutdown;
an instruction to the sensor to intercept one or more packets; and
an instruction to the sensor to close an associated port.

14. The method of claim 11 further comprising associating a generation date to the response message, the generation date indicating a date of the automatic generation of the response message.

15. The method of claim 14 further comprising:
comparing the generation date to an aging date, the aging date representing a past date that precedes a current date by a predetermined number of days; and
in response to the generation date of the response message preceding the aging date, automatically removing the associated response message from the response message file.

16. The method of claim 11 further comprising:
computing a verification value for the generated response message; and
associating the verification value with the generated response message.

17. The method of claim 16, wherein the plurality of sensors are operable to verify the response message based, at least in part, on the verification value.

18. The method of claim 11 further comprising communicating the response message to each of a plurality of response message files, each response message file comprising at least one response message and being associated with at least one sensor.

19. The method of claim 11, further comprising detecting if one or more packets in the plurality of packet flows is a stage of the attack, the attack comprising a plurality of stages.

20. The method of claim 19, wherein the generated response message comprises a first response message, the first response message operable to identify or impede the detected stage of the attack and the method further comprising:
generating a second response message, the second response message operable to identify or impede later stages of the attack; and
automatically communicating the second response message to the response message file.

21. A system comprising:
a plurality of sensors operable to receive data from a plurality of ports between an external network and an internal network, the plurality of sensors operable to process the received data according to a response message file;
the response message file;
a manager server communicably connected to the plurality of sensors and to the response message file, the manager server operable to:
receive a plurality of packet flows from the plurality of sensors;
aggregate the plurality of packet flows into an aggregated packet flow;
dynamically process the aggregated packet flow to detect if one or more packets in the plurality of packet flows represent an attack on the internal network;
automatically generate a response message in response to the attack, the response message operable to identify or impede the attack; and
automatically communicate the response message to the response message file.

22. The system of claim 21, the manager server further operable to communicate one or more processing messages to one or more of the plurality of sensors.

23. The system of claim 22, the one or more processing messages to one or more of the plurality sensors each consisting of one of the following:
- an instruction to the sensor to poll the response message file;
- an instruction to the sensor to reset;
- an instruction to the sensor to shutdown;
- an instruction to the sensor to intercept one or more packets; and
- an instruction to the sensor to close an associated port.

24. The system of claim 21, the manager server further operable to associate a generation date to the response message, the generation date indicating a date of the automatic generation of the response message.

25. The system of claim 24, the manager server further operable to:
- compare the generation date to an aging date, the aging date representing a past date that precedes a current date by a predetermined number of days; and
- in response to the generation date of the response message preceding the aging date, automatically remove the associated response message from the response message file.

26. The system of claim 21, the manager server further operable to:
- compute a verification value for the generated response message; and
- associate the verification value with the generated response message.

27. The system of claim 26, the plurality of sensors further operable to verify the response message based, at least in part, on the verification value.

28. The system of claim 21, wherein:
- the response message file comprises one of a plurality of response message files, each response message file being associated with at least one sensor; and
- the manager server is further operable to communicate the response message to each of at least a subset of the plurality of response message files.

29. The system of claim 21, wherein the manager server is further operable to detect if one or more packets in the plurality of packet flows is a stage of the attack, the attack comprising a plurality of stages.

30. The system of claim 29, wherein the generated response message comprises a first response message, the first response message operable to identify or impede the detected stage of the attack and the manager server further operable to:
- automatically generate a second response message, the second response message operable to identify or impede at least one of the later stages of the attack; and
- automatically communicate the second response message to the response message file.

* * * * *